United States Patent [19]

Ruhe

[11] Patent Number: 4,488,935
[45] Date of Patent: Dec. 18, 1984

[54] SOLAR/MICROWAVE VACUUM CONTINUOUS FEED DISTILLATION APPARATUS

[76] Inventor: Rodney C. Ruhe, 1000 Willmar Ave., Willmar, Minn. 56201

[21] Appl. No.: 360,669

[22] Filed: Mar. 22, 1982

[51] Int. Cl.³ .................... B01D 1/22; B01D 3/10
[52] U.S. Cl. ............................. 202/177; 202/180; 202/187; 202/192; 202/205; 202/234; 202/236; 202/237; 203/22; 203/100; 203/DIG. 1
[58] Field of Search .............. 202/205, 234, 236, 187, 202/180, 177, 237, 190-193; 203/10, 11, 100, DIG. 1, DIG. 16, 90, 89, 25, 22, 91, 99; 159/DIG. 26

[56] References Cited

U.S. PATENT DOCUMENTS

| | | | |
|---|---|---|---|
| 1,966,938 | 7/1934 | Stone | 203/11 |
| 2,490,659 | 12/1949 | Snyder | 203/DIG. 1 |
| 3,209,812 | 10/1965 | Sargeant | 203/100 |
| 3,261,764 | 7/1966 | Casey | 202/187 |
| 3,340,157 | 9/1967 | Weiss | 202/180 |
| 3,495,648 | 2/1970 | Amadon | 159/DIG. 26 |
| 3,505,172 | 4/1970 | Achener | 202/187 |
| 3,577,322 | 5/1971 | Nesbitt et al. | 203/11 |
| 3,607,667 | 9/1971 | Knapp et al. | 203/90 |
| 4,313,798 | 2/1982 | Myers | 202/234 |
| 4,323,431 | 4/1982 | Takahashi et al. | 203/89 |

FOREIGN PATENT DOCUMENTS 855458  11/1960  United Kingdom ............... 202/187

Primary Examiner—Wilbur Bascomb
Attorney, Agent, or Firm—Robert B. Famiglio

[57] ABSTRACT

An apparatus for the distillation of a fluid containing at least two constituent components is disclosed. The apparatus includes a microwave energy source and a solar energy collector, both of which may be used to heat a subject fluid to a greater temperature for the purpose of distillation of same. Further, the disclosed invention combines a vacuum within the apparatus to facilitate operation and enhance the overall energy efficiency of the apparatus.

7 Claims, 4 Drawing Figures

SOLAR/MICROWAVE VACUUM CONTINUOUS FEED DISTILLATION APPARATUS

BACKGROUND OF THE INVENTION

The present invention relates generally to distillation apparatus for the separation of fluid containing more than one constituent component, and more particularly concerns the distillation of such a fluid utilizing a combination of low atmospheric pressure, microwave energy, and/or solar energy. Though the utilization of distillation apparatus for the separation of fluids is well know to those skilled in the art, no apparatus has been disclosed which relates to the use in combination with microwave energy, in conjunction with solar energy and low vacuum for the rapid distillation of a compound fluid. In the present invention, the application of microwave energy is utilized to speed the process of fluid heating such as to allow more efficient utilization of input energy while allowing a substantial volume of fluid to be distilled over a short period of time. The present invention allows for the use of microwave energy in combination with a solar heat collector so as to reduce the amount of energy required from conventional sources in the distillation of a fluid. A solar heat collector functions with the microwave apparatus such as to take advantage of any sun light available at the particular site and location of the invention. The invention utilizes a means in which pure microwave energy can be used for the rapid distillation of the fluid should the solar energy be unavailable during certain periods of time. Further, the disclosed invention shows the use of a cooling jacket to facilitate separation of the subject fluid without the need for a separate cooling fluid.

Accordingly, it is the primary aim of the present invention to provide a rapid means of fluid distillation utilizing a high energy efficiency.

With more particularity, it is an object of the present invention to combine microwave energy and solar energy into an energy efficient apparatus for the rapid distillation of a compound fluid into its constituent components.

It is a further object of the present invention to provide for a low cost, compact apparatus utilizing a combination of microwave energy, solar energy, and low internal pressure in a vacuum which will provide optimum efficiency and fluid flow rate resulting in a high efficiency fluid distillation apparatus.

SUMMARY OF THE INVENTION

In accordance with the invention, the preferred embodiment contains generally seven sub-systems which operate in a fashion to allow distillation of a liquid which consists of at least two constituent components. The apparatus, as disclosed, utilizes microwave radio frequency energy to supply the heat energy required for distillation, while further providing for integration of an ancillary heat source to enhance efficiency of the entire device. The present invention allows for a continuum of fluid flow, thereby allowing a continuous, steady-state operation. This steady-state operation is a result of the utilization of the Torricelli Principle as it relates to fluid flow.

The seven major sub-systems consist of a microwave energy source, a solar energy collector panel, a vacuum pump system, a residue collector, a distillate collector, a condensation coil, and a main fluid distillation chamber which, itself, further includes a cooling jacket as an integral part of same. The invention as disclosed provides a method for utilizing microwave energy of the type commonly used for industrial heating for high speed heating of a subject fluid within the main cylinder of the apparatus. Additionally, the subject fluid is utilized as a coolant to reduce the temperature of the cylinder wall before it is introduced inside the cylinder for heating. This has the advantage of not requiring energy to provide cooling to facilitate condensation of the evaporated component within the cylinder. The subject fluid, after passing through the cooling jacket used to cool the cylinder chamber wall, passes through a conventional solar collector which is used to preheat the fluid, thus reducing the amount of energy which must be applied once the subject fluid is introduced into the chamber wherein microwave energy is applied. Once within the microwave energy chamber, the subject fluid undergoes radiation from the microwave energy source which serves to raise the temperature of said fluid to the point of fluid separation due to the varying boiling points of the constituent components of the fluid.

Further, the vacuum sub-system serves to reduce the atmospheric pressure within the apparatus such as to lower the boiling point of a particular constituent component of the subject fluid, thereby reducing further the energy requirement for heating the fluid. The various reservoirs are used to collect the resulting distillant and the residue fluid remaining after undergoing the above process.

While the invention will be described in connection with a preferred embodiment, it will be understood that it is not intended to limit the invention to that embodiment. On the contrary, it is intended to cover all alternatives. modifications, and equivalents as may be included within the spirit and scope of the invention as defined by the appended claims.

BRIEF DESCRIPTION OF THE DRAWINGS

Other objects and advantages of the invention will become apparent upon reading the following detailed description and upon reference to the drawing, wherein:

FIG. 3 further shows a fragmentary view of the capillary tubes which spiral upward within the core of the main cylinder.

DETAILED DESCRIPTION OF THE PREFERRED EMBODIMENT

Figure 1:
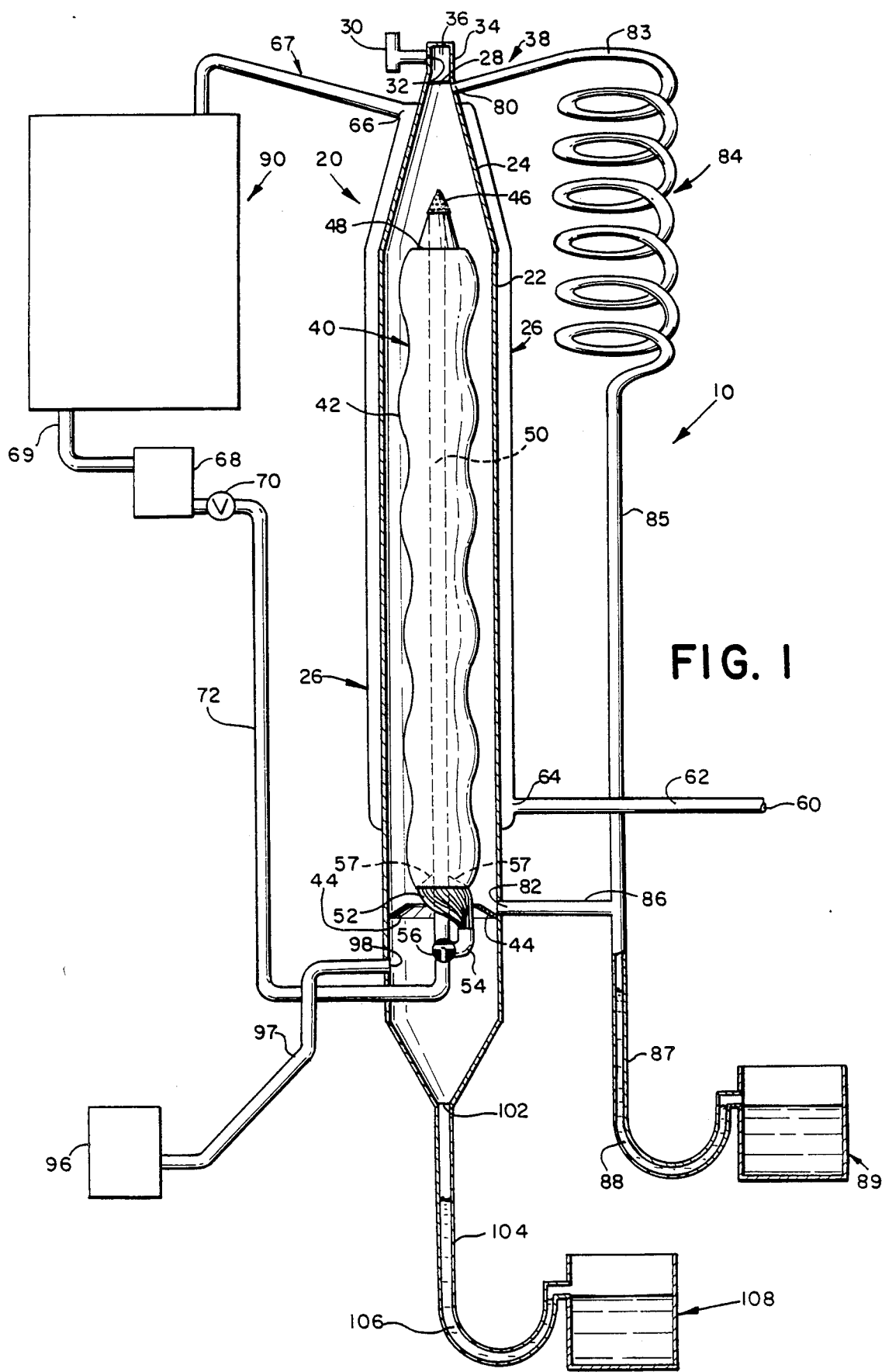
FIG. 1 is a side schematic view of the entire invention showing all of its systems and the interior layout of the main cylinder.

Turning now to FIG. 1, there is shown in its entirety the distillation apparatus 10 of the present invention. FIG. 1 shows a diagram of the apparatus which includes various major components. The central component of the main distillation unit 20 is the microwave energy apparatus 38 which includes a microwave energy source 30, a rectangular wave guide cavity 34, and a rectangular to circular wave guide transition section 24, a circular wave guide 22, and an undulated cylindrical surface of dielectric material 40 situated within circular wave guide 22. Other major components include a source, input 60 introducing a distilland liquid into apparatus 10, which feeds a cooling jacket 26 for the cooling of the wall which comprises wave guide 22. Other systems in the present invention include reservoir 89 for the distillate and reservoir 108 for the residue. A further subsystem illustrated in FIG. 1 is vacuum system 96 that serves to evacuate the main distillation unit 20, the operation of which will be described in detail hereafter.

Figure 4:
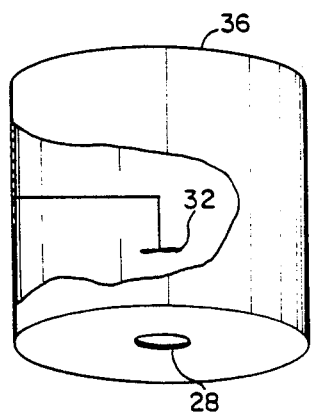
FIG. 4 is a close-up view of the wave guide cavity in the wave guide apparatus.

Turning now to microwave energy system 38, the operation of the disclosed wave guide distillation apparatus 10, centers on the energy source used to heat the liquid distilland applied to the system. Microwave source 30 provides a radio frequency energy source of a suitable frequency for use in radio frequency heating. The use of radio frequency energy to heat materials is well known to those skilled in the art, and has been used in many instances from industrial applications to home cooking. Microwave energy source used in the present invention does not differ significantly from past known microwave energy generation systems. Source 30 can be a magnetron, as used in the preferred embobiment, or some other suitable source which includes various solid state microwave generating systems such as an impatt diode or the like. Source 30 emits microwave radio frequency energy from probe 32, which is generally one-quarter wave length in nature. Probe 32 serves as an antenna source for the radiation of the energy generated by source 30 and the general cavity dimensions of rectangular wave guide section 34 will be determined by the frequency used in the operation of the apparatus. Design of wave guide cavity section 34 is further well known to those skilled in the art, the dimensions thereof are dictated by various constraints which are well illustrated in the literature. One of these constraints, as illustrated in FIG. 4, includes the distance between probe 32 and the back wall 36 of wave guide section 34. Spacing between probe 32 and wall 36 will be generally one-quarter wave length. Wall 36 serves as a short circuit or shunt termination. This design constraint is calculated to place the probe 32 at an antinode of the electric field which is generated by the probe when driven by the source 30. Through this method, the direct waves from the probe are reinforced by waves reflected from the back wall 36 of the wave guide section 34.

Below cavity 34 and opposite back wall 36 is iris 28 also illustrated in FIG. 4, Iris 28 is an airtight plane surface which serves to seal cavity 34 from the remainder of cylinder 20. At the same time, iris 28 is constructed of a dielectric material of an intrinsic impedence suitable for matching the characteristic output impedence of cavity 34 with the input impedance of transition section 24 described below. The design and placement of iris 28 are well known to those skilled in the art of microwave cavity design, and may be made of various thicknesses and materials. It is important to note that iris 28 must be designed such as to provide a vacuum or airtight seal between cavity 34 and transition section 24 when the remainder of cylinder 20 is evacuated.

Connecting energy system 38 with the major portion of the distillation unit is transition section 24. Section 24 is a wave guide apparatus which serves to transform the radio frequency energy travelling from cavity 34, which is polarized in a rectangular mode of propagation to a circularly polarized mode of propagation which would be necessary to be in concurrence with the circular wave guide 22. The design and dimensions of transition section 24, again, well known to those skilled in the art of microwave transmission and wave guide design, serves to transform the propagation modes from rectangular to circular with minimum of loss and reflection of energy back to the source. This transition being accomplished, the now circularly polarized radio frequency energy continues to propagate down the wave guide towards the closed end of circular wave guide 22. The physical length of circular wave guide section 22, as measured from transition section 24 to the end generally depicted by distillate collector 44, is large in terms of wave length and accomodates a cylindrical surface of dielectric material 40, which is suspended coaxially within the width of the circular wave guide section 22 as shown in FIG. 1. It should be noted that the length of the main distillation unit 20 is physically oriented such that the dimension across its width is perpendicular to a line which would define the direction from the earth's center to the vertical axis of unit 20.

Thusly, the cylindrical surface of dielectric material 40 intersects the radio frequency energy generated by source 30 over what is substantially the entire length of circular wave guide unit 22.

Turning now to the whole of the operation of the distillation apparatus 10, an inlet pipe 62, located at a lower position on the outer wave guide jacket 26, serves as a distilland inlet at 64. At the opposite end of circular section 22, and also at the opposite side to inlet 64, is located a second orifice 66 attached to jacket 26. This orifice, located at the juncture of the extreme end of the transition section 24, serves as the distilland outlet 66. Orifice 102, located at the lower extremity of the main unit 20, is the residue the outlet which ultimately feeds residue reservoir 108 through pipe 104 and u-pipe 106.

Figure 2:
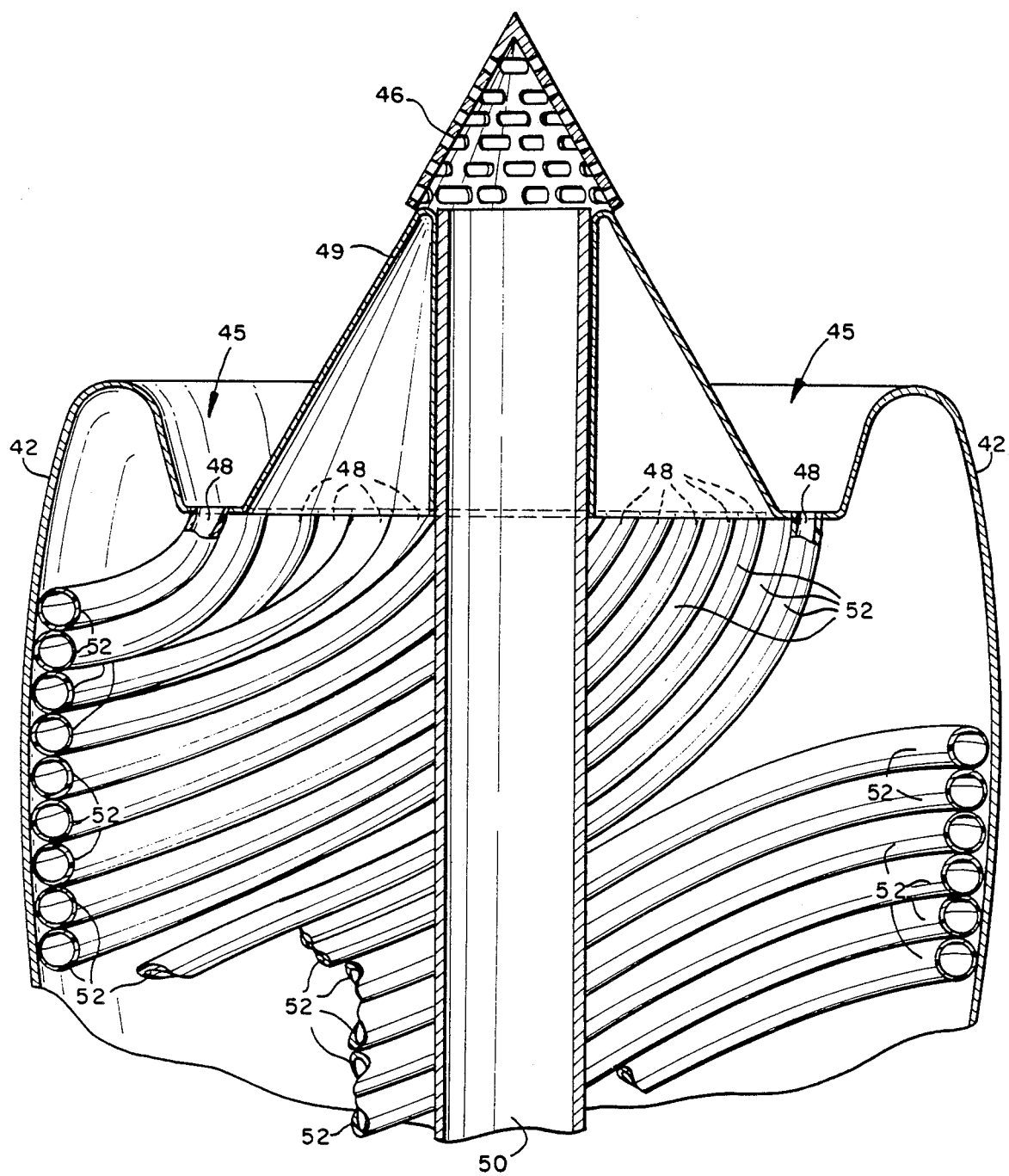
FIG. 2 is a side cut view of the upper interior fluid nozzle within the main cylinder, shown in FIG. 1, showing said nozzle together with the upper distilland reservoir and capillary tubes.

The cylinder of dielectric material 40 is generally composed of a material which is of an intrinsic impedence which most closely resembles that of air. In the preferred embodiment, cylinder 40 is formed with undulations on its surface 42 so as to form a wavy surface. Cylinder 40 extends, as shown, from the upper edge of wave guide 22 to the distillate outlet 82. Cylinder 40 spans the length of the wave guide section 22 and is thus supported generally by the distalland supply pipe 50 and tube support 57. Cylinder 40 extends through the wave guide 22 coaxially. The support of cylinder 40 is illustrated further in FIG. 2 which shows a more detailed view of the top of cylinder 40. As can be seen in FIG. 2, cylinder 40 contains an array of outlets in a nozzle 46 which serves to distribute any liquid which may be flowing up pipe 50 to the outlet nozzle 46.

All the openings of the wave guide 20, shown at 80, 82, and 102 are joined to metal pipes, which form the beginning of a vacuum lock system for each said orifice. It should be noted that a mesh screen, not shown, is constructed over each of the so described orifices such as to provide a continuum in the suface of cylinder 20. This allows fluids to pass through these orifices while preventing the shunting of microwave energy out through said orifices.

Turning now to the operation of distillation apparatus 10, the function of same will be described from input to output of the system, as will normally be observed during operation of the device. A distilland liquid enters from a reservoir, not shown, through input 60. The pressure of the distilland liquid present in input 60 is sufficient to propel the liquid throughout the apparatus 10. This pressure may be derived in a static fashion by simply having a reservoir containing said liquid at a height well above the highest point present in apparatus 10 so that the gravity feed will be sufficient in all instances. The distilland fluid entering input 60 is transmitted by pipe 62 to cooling jacket 26. Pipe 62 is attached to jacket 26 at inlet 64. The distilland travels upward throughout the jacket 26 until the upper level of said fluid reaches outlet 66 at the top of jacket 26. It should be noted that there is no connection or inlet between the interior of jacket 26 and the interior of wave guide 22 or with transition section 24. The function of jacket 26 is to cool the wall of cylinder 22, the significance of which will be described later. The distilland fills jacket 26 and exits via port 66 and is transmitted further through pipe 67 so as to enter solar heating system 90. System 90 is a solar panel device which contains a plurality of internal piping channels such as to transmit any absorbed solar radiation to the distilland liquid, thereby raising the liquid's temperature. After travelling through solar panel 90, the distilland liquid exits at the bottom of said panel and is transmitted via output pipe 69 to reservoir 68. Reservoir 68 functions in a storage capacity only, thereby regulating the flow of any liquid out of panel 90 by serving to smooth any short term irregularities in the flow rate of the distilland fluid. Exiting reservoir 68, the distilland passes through valve 70 which can be a simple stop-cock apparatus, or other valve, which is used to regulate the amount of distilland travelling out of reservoir 68 and down pipe 72. The distilland flowing down through pipe 72 enters the distillation unit 20 at the lower extremity therein. The fluid flowing through pipe 72, after entering the outer wall of the distillation unit 20, intersects valve 56. Valve 56, shown in FIG. 1 and illustrated in more detail in FIG. 3, serves to direct the distilland fluid flowing from pipe 72 to two alternative routes through the main distillation unit 20. The first optional route for the distilland fluid would be via pipe 50, thereby directing the fluid in a straight path up the center of pipe 50, ending at nozzle 46, as shown in FIG. 1. This path would be elected by the turning of valve 56 in a situation in which the temperature of the distilland fluid is sufficient to cause separation of said fluid into the distillate and residue components of the distilland fluid. This latter situation would exist if the temperature of said distilland is raised sufficiently when passing through solar panel 90 to separate into its constituent components upon exiting through nozzle 46. It should be explained at this point that the interior region of wave guide 22 is maintained at a low atmosphere pressure via vacuum pump 96. The combination of a lower atmosphere pressure and higher temperature will frequently be adequate for the separation of a distilland liquid without more, or in some instances, with the addition of slightly more heat energy to effectuate the separation of the components, as will be explained later.

Continuing with the description of the first mode of operation, the distilland fluid travelling vertically up pipe 50 exists through nozzle 46, as more clearly illustrated in FIG. 2. The fluid is disbursed throughout the various orifices in nozzle 46 such that the distilland fluid flows down plane surface 49, thereby filling the reservoir formed by the top edge of evaporator surface 42 which is the surface of evaporator cylinder 40. As the distilland flows down plane 49 and fills reservoir 45 it begins to spill over the leading edge of evaporator surface 42 and travels downward and over surface 42 by adhering to the surface thereof, being acted upon by gravity. The distilland fluid at this point is of a higher temperature due to the energy transferred to it earlier by solar panel 90, and is further disposed to be more easily separated due to the lower atmospheric pressure present within the wave guide 22. As the distillate emerges from nozzle 46, through reservoir 45, and down over surface 42, the distillate evaporates readily from the surface 42 and condense on the inner walls of the wave guide cylinder 22. The wall temperature of wave guide 22 is considerably lower than the internal temperature of the cylinder due to the fact that cooling jacket 26 surrounds said wave guide, as described earlier, and lowers the temperature of the wall. The distillate which has evaporated, thereby condenses on the inner wall of wave guide 22 and travels downward under the influence of gravity until it reaches the distillate collector 44 shown at the bottom of the cylinder in apparatus 20. Collector 44 is an inverted dish-like structure which collects the distillate dripping down the wall of wave guide 22 so as to direct it out outlet 82, as shown in FIG. 1.

It should further be noted that the distillate collection system further includes an outlet 80 at the top of the main apparatus 20, thereby further collecting any distillate vapor which does not condense or contact the inner wall of cylinder 22 after evaporating off of surface 40. This remaining distillate would be collected at outlet 80, travel through connecting pipe 83, into cooling coil 84. Inherently, the temperature of the coil 84 would be substantially lower to the internal temperature of the main distillation unit 20, thereby causing the distillate fluid to condense in coil 84 and, acted on by gravity, continue down through connecting pipe 85 to join the distillate fluid exiting at 82 at junction 86. The distillate fluid then collects in pipe 87. is connected through u-pipe 88 and finally is deposited in reservoir 89 which contains the distillate fluid removed from the original distilland fluid input. It should be noted that the level of the fluid in pipe 87 does not seek the same level as the reservior fluid in 89, even though reservoir 89 is open to atmospheric pressure. This is so due to the lower pressure induced inside the distillation unit 20 because of the operation of vacuum pump 96 which serves to maintain lower atmospheric pressure within cylinder 20; the significance of which is more fully described later.

Figure 3:
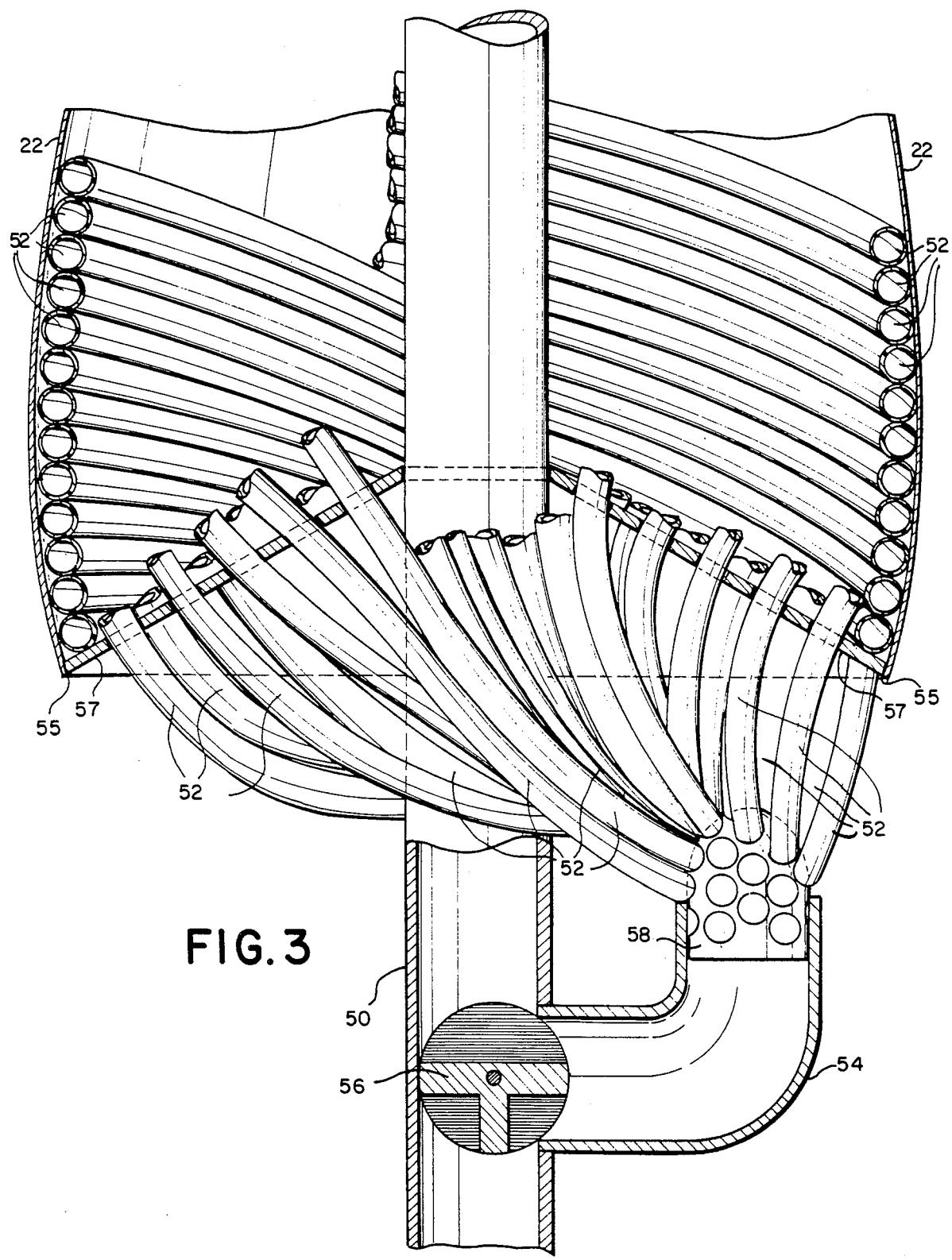
FIG. 3 is a side-cut view of the lower interior of the main cylinder of FIG. 1 showing the valve switching system which directs the travel of the distilland fluid to two alternate paths.

Continuing with the operation of system 10 in the first mode, as above described, the remaining residue travelling down the surface 42 of cylinder 40, travels under the influence of gravity to the end of surface 42 such as to drip off the edge of 42, shown at 55 in FIG. 3. The residue of the original fluid then, as it exits off of the surface via the edge 55, drips down to the lower most extremity of the main unit 20 such as to flow into the outlet 102, as shown in FIG. 1, thereby travelling down pipe 104, through u-pipe 106, entering into residue reservoir 108, which is open to atmospheric pressure. As with the distillate system above described, it will be noted that the fluid level in pipe 104 is at a higher level than the level shown in reservoir 108, due to the fact that the atmospheric pressure within the main unit 20 is lower than that of a standard atmosphere.

Turning now to the operation of the vacuum pump 96, an important aspect of the present invention will now be described. In considering the operation of the distillation apparatus 10, an essential element of such operation is the existence of a lower atmospheric pressure within cylinder 20. Vacuum pump 96 provides this lower pressure by evacuating cylinder 20 through orifice 98, which is operably connected to pump 96 via line 97. Inherently, to maintain continuous operation of vacuum pump system requires expending energy to operate said system. The energy input required to operate pump 96 would necessarily factor into the total efficiency of the distillation apparatus 10. Therefore, it is desirable to operate the system with a minimum of energy required for pump 96, while maintaining a low pressure within cylinder 20. This is accomplished with the design disclosed in apparatus 10.

Once the interior of cylinder 20 is evacuated by pump 96, the input of distilland through pipe 72, and ultimately through valve 56. is carefully balanced with the output of both the residue contained in u-pipe 106. and the distillate contained in u-pipe 88. Utilizing Torricelli's theorem, the internal low pressure, in cylinder 20, will be maintained during the steady-state conditions present during a constant input flow rate through line 72. Thusly, the energy advantage derived by the presents of low pressure within cylinder 20 can be maintained without the application of energy to pump 96 in a continuous mode. It is contemplated that pump 96 will be operated intermittently such as to reevacuate the interior of cylinder 20 upon the loss of the desired vacuum within. Such a loss may be due to any long term effects of imperfect vacuum seals and general leakage or loss in the system. However, the maintenance of the vacuum in apparatus 10 as described is an important aspect of the present invention due to the contribution it affords to the total energy efficiency of the system.

Turning now to the second mode of operation of the preferred embodiment, we return to the operation of valve 56 located at the lower extremity of main cylinder 20, further detailed in FIG. 3. When valve 56 is selected in the proper position, distilland fluid flowing through pipe 72 into the main unit 20 can be directed through u-pipe 54 so as to be introduced into spreader nozzle 58 which connects u-pipe 54 to a plurality of Teflon capillary tubes 52. As shown in detail in FIG. 3, tubes 52 pervade the interior of surface 42 and spiral their way towards the top of cylinder 40, adjacent to the interior of surface 42, until finaly exiting at outlets 48 located at the bottom of the reservoir 45, as detailed in FIG. 2. In this operational mode, the distilland fluid comes to be exposed to the microwave energy being transmitted downward through wave guide 22, for a much longer length of time, due to the increased period of time the fluid spends within the microwave field. Therefore, the fluid travelling through tubing 52 and exiting at outlets 48 has been significantly raised in temperature from that which existed at the entry of the tubes at outlet 58. The operation within the main distillation unit 20 hereafter is similar to the operation described in mode one above. The chief difference between mode one and mode two of operation depends on the temperature of the distilland liquid as it enters through main distillation unit 20 through input pipes 72. If the temperature of the distilland fluid in input pipes 72 is high enough at the outset, it is not necessary to expose the distilland liquid to microwave energy for heating for an extended period of time. Therefore, mode one will produce the fastest distillation of the liquid involved. Should the temperature of the distilland fluid entering through tubes 72 be insufficient to cause separation of the components without additional heating, mode two can be selected to afford an additional period of time for the exposure of the distilland fluid to the microwave energy field, thusly raising its temperature significantly before its advancement to the evaporator surface 42 of cylinder 40.

It is contemplated that the operation of apparatus 10 in the second mode so described will necessitate a lower flow rate of the distilland fluid entering the system through inlet 60. This is so due to the increased flow resistance offered by the introduction of the distilland fluid through the capillary tube system 52. Further, the flow rate of the distilland through system 10 must be slow enough so that the distilland fluid is exposed to the microwave energy within wave guide 22 for a period of time sufficient to raise its temperature to that necessary for separation as described. The function and use of microwave energy for the heating of a substance or physical material is well known to those skilled in the art. When a suitable temperature is reached, the distillate will evaporate. Further, the flow must be of a rate which is low enough to allow the solar collector 90 to function in its normal manner. Too high a flow rate through collector 90 would reduce its efficiency in transmitting solar energy into heated liquid. In certain situations, the distilland fluid may be preheated by solar panel 90 such that, while not of sufficient temperature to utilize mode one, may serve to speed the distillation process in mode two due to such preheating.

In actual construction of apparatus 10, it should be noted that it is possible to construct the cylinder unit 20 such that the bottom portion of same is removable, thereby allowing access to the normally airtight unit 20 for the purpose of cleaning the interior components. It has been the experience of the inventor that the distillation apparatus, in general, tend to collect waste matter and residue about the walls of any container. Construction which utilizes stainless steel and other non-corrosive materials facilitate the periodic cleaning of the interior of cylinder 20.

Thus it is apparent that there has been provided, in accordance with the invention, a description that fuly satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An apparatus for the distillation of a fluid comprising:
   a microwave energy source for vaporizing a fluid within a wave guide;
   a hollow wave guide operatively connected thereto;
   an evaporator surface disposed within and concentric to the axis of said wave guide extending substantially the entire length of said wave guide;
   a first orifice for the introduction of a distilland fluid onto said evaporator surface;
   a second orifice disposed on the surface of said wave guide for the collection of any distillate generated within said wave guide;
   a third orifice disposed on the surface of said wave guide which is located at a point which is substantially the lowest elevation within said wave guide, for the collection of a residue fluid generated with said wave guide; and
   condensing means for condensing vapor within said wave guide.

2. The apparatus of claim 1 further comprising a system for the introduction of a predetermined vacuum, operatively connected to said wave guide such as to provide said vacuum in said wave guide.

3. The apparatus of claim 1 further comprising a solar energy collection means operatively connected to said first orifice for the introduction of a distilland fluid in a manner which requires said distilland fluid to flow through said means before being introduced onto said evaporator surface through said first orifice, wherein further said solar energy collection means is operatively connected to a source of distilland fluid.

4. The apparatus of claim 2 further comprising a solar energy collection means operatively connected to said first orifice with the introduction of a distilland fluid in a manner which requires said distilland fluid to flow through said means before being introduced onto said evaporator surface through said first orifice.

5. The apparatus of claim 4 further comprising a fluid vessel jacketed about and concentric with said wave guide wherein said vessel is operatively connected between a source of distilland fluid and said solar energy collection means and in a manner in which the inner surface of said fluid vessel is comprised of the outer surface of said wave guide in a manner which facilitates conduction and transmission of heat energy from said surface of said wave guide into the distilland fluid traveling through said fluid vessel, such as to promote condensation of any vaporous materials within said wave guide upon the surface of said wave guide.

6. The apparatus of claim 5 wherein the first orifice for the introduction of distilland fluid is situated at an elevation which is greater than the static level of said fluid at the point in which said fluid originates; said second orifice exiting from said wave guide for the collection of distillate is operatively connected to a containing vessel for the storage of said distillate through a vertically oriented u-pipe wherein the fluid level in said containing vessel is lower than the static fluid level within said u-pipe; and said third orifice exiting from the surface of said wave guide disposed at said lowest elevation of said wave guide is operatively connected to a containing vessel for the storage of said residue through a vertically oriented u-pipe wherein the fluid level in said containing vessel is lower than the static fluid level within said u-pipe.

7. The apparatus of claim 6 wherein said system for the introduction of a predetermined vacuum comprises a vaccum pump having means which operate to maintain said predetermined vacuum when the level of said vacuum varies over time.

* * * * *